United States Patent
Baumeister et al.

(10) Patent No.: US 10,041,418 B2
(45) Date of Patent: Aug. 7, 2018

(54) FLAP DEVICE FOR AN INTERNAL COMBUSTION ENGINE

(71) Applicant: PIERBURG GMBH, Neuss (DE)

(72) Inventors: Lars Baumeister, Nettetal (DE); Dirk Kamarys, Willich-Neersen (DE)

(73) Assignee: PIERBURG GMBH, Neuss (DE)

( * ) Notice: Subject to any disclaimer, the term of this patent is extended or adjusted under 35 U.S.C. 154(b) by 17 days.

(21) Appl. No.: 15/124,355

(22) PCT Filed: Jan. 20, 2015

(86) PCT No.: PCT/EP2015/050960
§ 371 (c)(1),
(2) Date: Sep. 8, 2016

(87) PCT Pub. No.: WO2015/135669
PCT Pub. Date: Sep. 17, 2015

(65) Prior Publication Data
US 2017/0016404 A1    Jan. 19, 2017

(30) Foreign Application Priority Data

Mar. 12, 2014 (DE) .......... 10 2014 103 319

(51) Int. Cl.
*F02D 9/04*   (2006.01)
*F02M 26/53*  (2016.01)
*F02D 9/10*   (2006.01)
*F16K 1/22*   (2006.01)
*F02M 26/70*  (2016.01)
(Continued)

(52) U.S. Cl.
CPC .............. *F02D 9/04* (2013.01); *F02D 9/1065* (2013.01); *F02M 26/53* (2016.02); *F02M 26/70* (2016.02); *F16K 1/22* (2013.01); *F16K 1/221* (2013.01); *F16K 3/06* (2013.01); *F16K 3/10* (2013.01); *F02M 26/72* (2016.02)

(58) Field of Classification Search
CPC ......... F02D 9/04; F02D 9/1065; F02M 26/53; F02M 26/70; F02M 26/72; F16K 3/06; F16K 3/10
USPC .......... 60/324; 251/301, 251, 305, 308, 229, 251/249.5; 123/568.11
See application file for complete search history.

(56) References Cited

U.S. PATENT DOCUMENTS

| 4,008,877 A | 2/1977 | Yasuoka et al. |
| 2010/0206274 A1* | 8/2010 | Furukawa ............... F16K 35/14 123/568.11 |
| 2013/0313460 A1* | 11/2013 | Kobayashi ............ F02M 26/50 251/286 |

FOREIGN PATENT DOCUMENTS

DE    195 26 144 A1    1/1997

* cited by examiner

*Primary Examiner* — Laert Dounis
*Assistant Examiner* — Kelsey Stanek
(74) *Attorney, Agent, or Firm* — Norman B. Thot

(57) ABSTRACT

A flap device for an internal combustion engine includes a flap body comprising at least one end position, a shaft which has the flap body arranged thereon, a housing which has a flow duct formed therein, an actuator which rotates the shaft in the flow duct, a lever which includes a lever surface, the lever being attached to the shaft outside of the flow duct, and an abutment which has the lever bear thereon in the at least one end position of the flap body. The flow duct includes a throughflow cross section which is regulated by a rotation of the shaft. The lever surface which faces toward the abutment includes an abutment region which is formed so as to be inclined in a direction of the abutment with respect to a radially outwardly extending straight line.

7 Claims, 1 Drawing Sheet

(51) Int. Cl.
_F16K 3/06_ (2006.01)
_F16K 3/10_ (2006.01)
_F02M 26/72_ (2016.01)

FLAP DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2015/050960, filed on Jan. 20, 2015 and which claims benefit to German Patent Application No. 10 2014 103 319.1, filed on Mar. 12, 2014. The International Application was published in German on Sep. 17, 2015 as WO 2015/135669 A1 under PCT Article 21(2).

FIELD

The present invention relates to a flap device for an internal combustion engine with a flap body, a shaft on which the flap body is arranged, a housing in which a flow duct is formed, the throughflow cross section can be regulated by rotation of the shaft, an actuator by which the shaft can be rotated in the duct, a lever fastened on the shaft outside the flow duct, and an abutment against which the lever bears in at least one end position of the flap body.

BACKGROUND

Such flaps are used, for example, in exhaust gas ducts of internal combustion engines in order to regulate the exhaust gas mass flow conveyed through the exhaust gas duct or to generate a counter-pressure for an increase in exhaust gas conveyance in a parallel duct. They are correspondingly used as exhaust gas accumulation flaps, exhaust gas recirculation flaps, or flaps for heat recovery.

Due to the high thermal load in the exhaust gas area, these flap devices are made of materials that are as resistant as possible in order to achieve the longest possible service life. Various concepts have been set forth in recent years for the bearing and sealing of such flaps to the outside. Besides a good tightness to the outside, a growing demand exists for an exact regulation and a good tightness in the closed state of the flap. Abutments for the flap bodies were primarily used in order to achieve a good tightness, the abutments being formed in the duct. However, a problem is this regard exits in that accretions on the shoulders required for that purpose cause the tightness to deteriorate with increasing life span.

For this reason, elliptic flap bodies which abut on the smooth duct walls are increasingly used. In order to avoid a jamming of the flap in the duct, it is necessary to provide abutments in the region not flowed through with which the rotation of the flap body in the duct is limited.

DE 195 26 144 A1, for example, describes an exhaust gas flap which is moved against an internal abutment in the housing to provide a closing that is as tight as possible, and which has an external abutment against which a lever of the flap shaft is moved. Such an arrangement must be manufactured very precisely in order to avoid that, when the flap is closed, the external abutments are formed corresponding to the internal abutments since leakages may otherwise occur at the flap.

This results in the hitherto unsolved problem to provide a long-term tightness of a closed exhaust gas flap. Besides the accretions occurring on the shoulders in the flow housing, thermal expansions of the housings also occur which often differ from those of the flap body or the lever. A jamming of an elliptic flap in an exhaust gas duct is thereby caused since the external abutment is no longer reached at the time the flap body closes the duct. An excessive turning of the flap is instead caused.

SUMMARY

An object of the present invention is to provide a flap device with which it is possible to avoid, despite thermal loads, an excessive turning of the flap and thus of the flap body in the duct which results in a jamming of the flap body while still achieving a high degree of tightness of the flap in the state closing the duct. Another aspect of the present invention is to provide a position to be moved to that provides a tight closing even when the flap body and the housing have different thermal expansions.

In an embodiment, the present invention provides a flap device for an internal combustion engine includes a flap body comprising at least one end position, a shaft configured to have the flap body be arranged thereon, a housing configured to have a flow duct formed therein, an actuator configured to rotate the shaft in the flow duct, a lever comprising a lever surface, the lever being attached to the shaft outside of the flow duct, and an abutment configured to have the lever bear thereon in the at least one end position of the flap body. The flow duct comprises a throughflow cross section which is regulated by a rotation of the shaft. The lever surface which faces toward the abutment comprises an abutment region which is formed so as to be inclined in a direction of the abutment with respect to a radially outwardly extending straight line.

BRIEF DESCRIPTION OF THE DRAWINGS

The present invention is described in greater detail below on the basis of embodiments and of the drawings in which.

DETAILED DESCRIPTION

Figure 1:
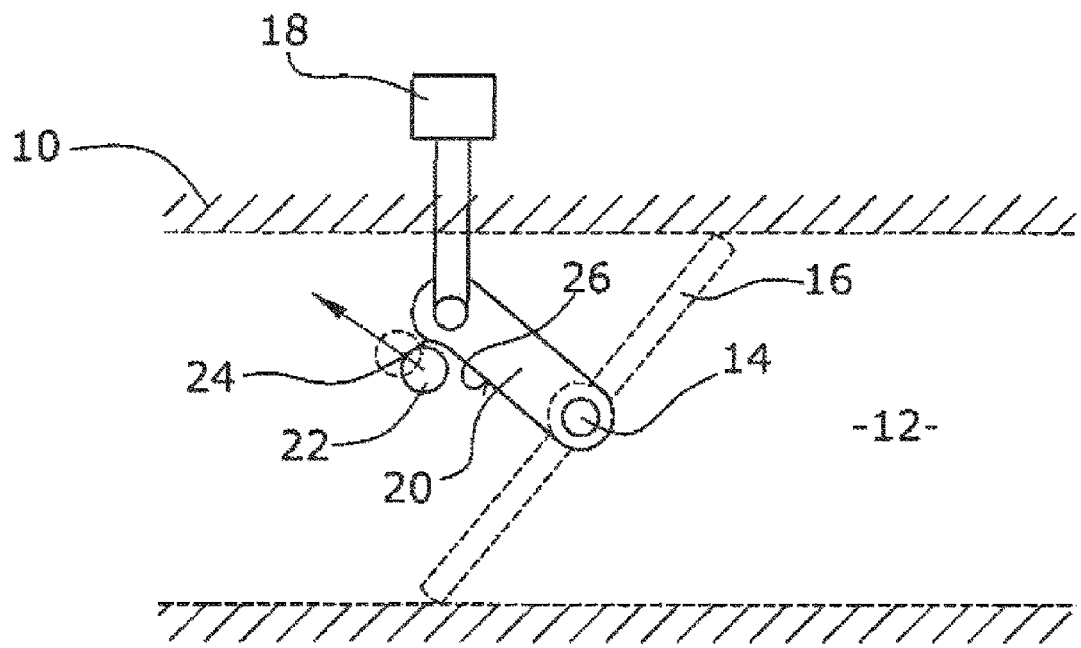
FIG. 1 shows a side view of a first embodiment of a flap device of the present invention with the flap body shown in dotted lines in the flow duct in a schematic illustration.

Due to the fact that the surface of the lever facing to the abutment has an abutment region that is inclined towards the abutment with respect to a straight line extending radially outward, it is possible to compensate for a displacement of the abutment in the axial and radial directions with respect to the pivot of the shaft caused by thermal expansion. An excessive turning of the flap in the flow duct and a resulting jamming are thereby prevented. Internal abutments which, in the long run, might lead to leakage due to accretions are not required, while a tight closure is still achieved. It is also possible to adjust for thermal expansion differences between the flap body and the housing by selecting different rotation angle positions.

In an embodiment of the present invention, the abutment region can, for example, be continuous in shape. It is thereby possible to move to an abutment that is constant with respect to the rotation angle position of the flap for any expansion of the housing occurring due to rising temperatures.

Depending on the expansion occurring, the abutment region is either of a straight shape or has a curvilinear shape. The expansions follow a corresponding function that can be represented by the shape of the abutment region on the lever.

In an embodiment of the present invention, the abutment can, for example, be formed on the housing of the flow duct. This is in particular advantageous when lever linkages and remotely located actuators are used since the abutment is formed close to the flap body, whereby failures can be avoided that occur due to tolerances adding up.

In an embodiment of the present invention, the abutment can, for example, be formed inside an actuator housing. With actuators positioned immediately at the flow housing, this facilitates the manufacture of the housing without having to expect failures due to tolerances adding up.

In an embodiment of the present invention, the lever can, for example, be designed as a tooth segment which, in an end position, bears against the abutment. Additional levers for rotational movement can thus be omitted. The abutment here can, for example, be arranged at the output pinion of the gearing so that a very precise limitation of the rotation angle is again possible.

A flap device for an internal combustion engine is accordingly provided with which a very precise externally arranged rotation angle limitation is achieved that is correspondingly simple to manufacture. A jamming of the flap in the duct caused by thermal expansions or a leakage caused by accretions on a valve seat serving as an abutment are reliably avoided. An optimum flap position for closing the duct can also be moved to for any temperature if different thermal expansions of the flap body and the housing are expected.

A flap device for an internal combustion engine of the present invention is illustrated in the drawings and will be described hereinafter.

The flap device of the present invention comprises a housing 10 in which a flow duct 12 is formed through which in particular hot exhaust gas flows. A shaft 14 extends at the center of the cross section through the flow duct 12, the shaft 14 being supported on both sides in the housing 10. A flap body 16 is fastened on the shaft 14, which flap body 16 is turned in the flow duct 12 upon actuation of an actuator 18 connected with the shaft 14 so as to thereby regulate the available throughflow cross section and thus the exhaust gas flow in the flow duct 12. The shaft 14 protrudes out from the housing 10 at at least one axial end thereof. A lever 20 is fastened on this end, the shaft 14 being operated via this lever.

An abutment 22 is formed on the housing 10 on the side averted from the flow duct 12, against which abutment 22 an abutment region 24 of a surface 26 of the lever 10 facing to the abutment 22 bears in an end position of the flap body 16 in the flow duct 12. In this end position, the flap body 16 fully closes the throughflow cross section of the flow duct 12 so that no more exhaust gas flow exists. The flap body 16 can, for example, be slightly elliptic in shape and bear against the abutment in an inclined position since in this manner a closure can be achieved for different thermal expansions of the flap body 16 and the housing 10.

Upon a cold start of the internal combustion engine, the temperature of the housing 10 substantially corresponds to the ambient temperature. During the warm-up period, hot exhaust gas flows into the flow duct 12, whereby the housing 10 heats up to a temperature of up to 400° C. This causes a longitudinal expansion and possibly a radial expansion of the housing 10 that depends on the size of the duct, but which may amount to up to a few tenths of a millimeter.

Assuming the rotational axis of the shaft 14 as the point of reference, the abutment 22 moves away from the rotational axis in the axial and radial directions due to the heating. With a radially extending lever, this results in the lever bearing against the abutment 22 with a delay and having another surface of contact with the abutment 22. This means that the flap body 16 continues its rotation compared to the cold state, and possibly does so to the extent that the flap body 16 becomes stuck at the inner walls of the housing 10, i.e., becomes jammed.

For this reason, the present invention provides that the lever 20 has an abutment region 24 on its surface 26 facing toward the abutment 22, which region is shaped so that the expansion differences are compensated under any conditions by the abutment point changing with the change in temperature. For this purpose, the abutment region 24 in FIG. 1 is designed to be inclined towards the abutment 22 with respect to the radial direction, and is inclined along a continuous curve spreading further away with respect to the radial direction. This means that the distance from the radial direction continuously increases with the extension in the radial direction.

In the present embodiment, the increase of the distance is not merely linear, but is approximately quadratic. Which function is to be used in this case should be determined in an optimal manner by tests since the expansion of the housing 10 must be compensated. It might also be necessary to adjust the rotation angle position of the flap body 16 to the temperature if the flap body 16 has a different expansion behavior than the surrounding housing 10 which must be expected whenever two different materials are used in manufacture. The point of contact can thus be defined for each temperature by shaping the abutment region 24 so that the flap body 16 is in a position to close the flow duct 12 when reaching the abutment 22 in an ideal manner.

Figure 2:
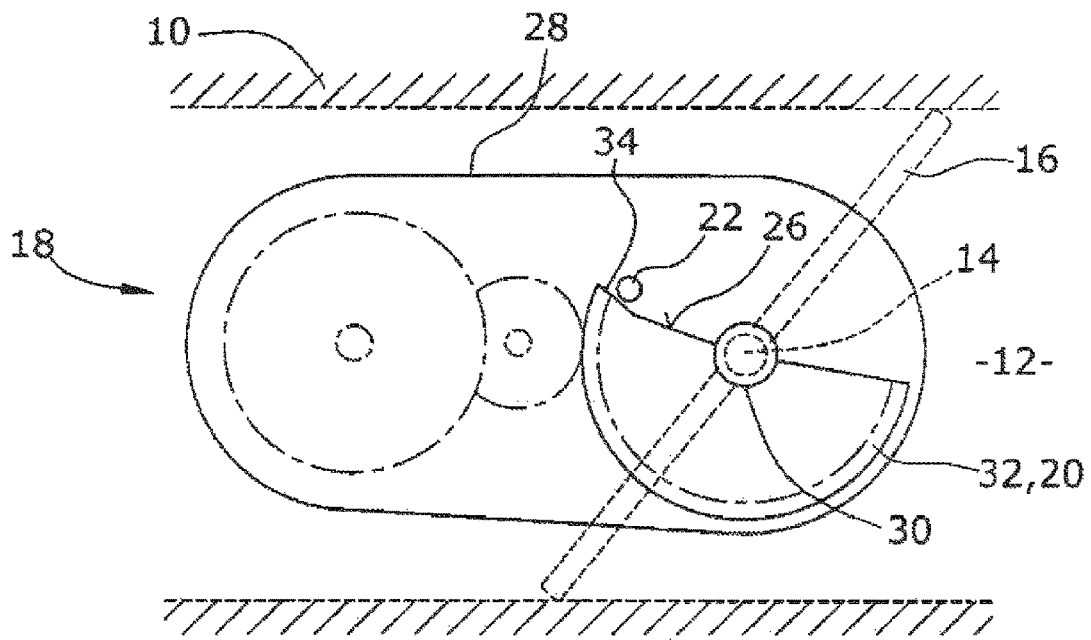
FIG. 2 shows a side view of a second embodiment of a flap device of the present invention with the flap body shown in dotted lines in the flow duct in a schematic illustration.

For the description of the second embodiment illustrated in FIG. 2, similar reference numerals will be used hereunder for functionally similar elements. In this embodiment, as compared to FIG. 1, the abutment 22 is arranged within an actuator housing 28, i.e., on the inner wall thereof. The output shaft 30 of the actuator 18 is directly coupled with the shaft 14 on which the flap body 16 is arranged. An output pinion is fastened on the output shaft 30, which acts as a lever 20 and is designed as a gear segment 32. The flat side of the gear segment 32 forms the surface 26 directed to the abutment 22, on which surface 26 an abutment region 34 is formed which in the end position of the flap body 16 closing the flow duct 12 is moved against the abutment 22.

The abutment region 34 is configured so that, as in the first embodiment, the distance to a radially extending straight line increases in the radial outward direction, but does so only linearly. The surface of this abutment region 34 correspondingly includes a constant angle with the radial direction of the lever 20.

The actuator 18 is less subjected to the thermal load caused by the exhaust gas so that the displacement of the abutment 22 by the thermal expansions is smaller. In this embodiment, the displacement of the flap position for closing the flow duct 12 must thus primarily be compensated by the design of the abutment region 34.

An optimal design of the lever must be determined in a corresponding manner by tests or simulation. A flap device of such design can reliably avoid both displacements of the closing angle inside the flow duct and displacements of the external abutment caused by thermal expansions. It should be noted that, for better understanding, the designs of the abutment region are shown to be enlarged when compared to the real products and typically extend for only a few tenths of a millimeter.

It should be clear that the scope of protection of the present invention is not limited to the embodiments described and to the use in connection with exhaust gases described herein. Such a flap device is useful wherever different materials are used and thermal expansions occur. Reference should also be had to the appended claims.

What is claimed is:

1. A flap device for an internal combustion engine, the flap device comprising:
    a flap body comprising at least one end position;
    a shaft configured to have the flap body be arranged thereon;
    a housing configured to have a flow duct formed therein, the flow duct comprising a throughflow cross section which is regulated by a rotation of the shaft;
    an actuator configured to rotate the shaft in the flow duct;
    a lever comprising a lever surface, the lever being attached to the shaft outside of the flow duct; and
    an abutment configured to have the lever bear thereon in the at least one end position of the flap body,
    wherein,
    the lever surface which faces toward the abutment comprises an abutment region which is formed so as to be inclined in a direction of the abutment with respect to a radially outwardly extending straight line using a rotational axis of the shaft as a point of reference,
    a point of contact between the abutment and the abutment region defines an abutment point, and
    the abutment region is shaped so that expansion differences between the abutment region of the lever and the abutment are compensated under any conditions via the abutment point changing with a change in temperature.

2. The flap device as recited in claim 1, wherein the abutment region comprises a continuous shape.

3. The flap device as recited in claim 1, wherein the abutment region is configured to be straight.

4. The flap device as recited in claim 1, wherein the abutment region is configured to have a curvilinear shape.

5. The flap device as recited in claim 1, wherein the abutment is formed on the housing comprising the flow duct.

6. The flap device as recited in claim 1, further comprising an actuator housing, wherein the abutment is formed inside the actuator housing.

7. The flap device as recited in claim 6, wherein the lever is formed as a gear segment which, in an end position, is configured to bear against the abutment.

* * * * *